July 2, 1968 R. L. KEYT 3,391,040
METHOD AND APPARATUS FOR MAKING FIBER REINFORCED
RESIN ARTICLES IN TUBULAR FORM
Filed May 7, 1964 2 Sheets-Sheet 1

INVENTOR.
Robert L. Keyt
BY
ATTORNEYS

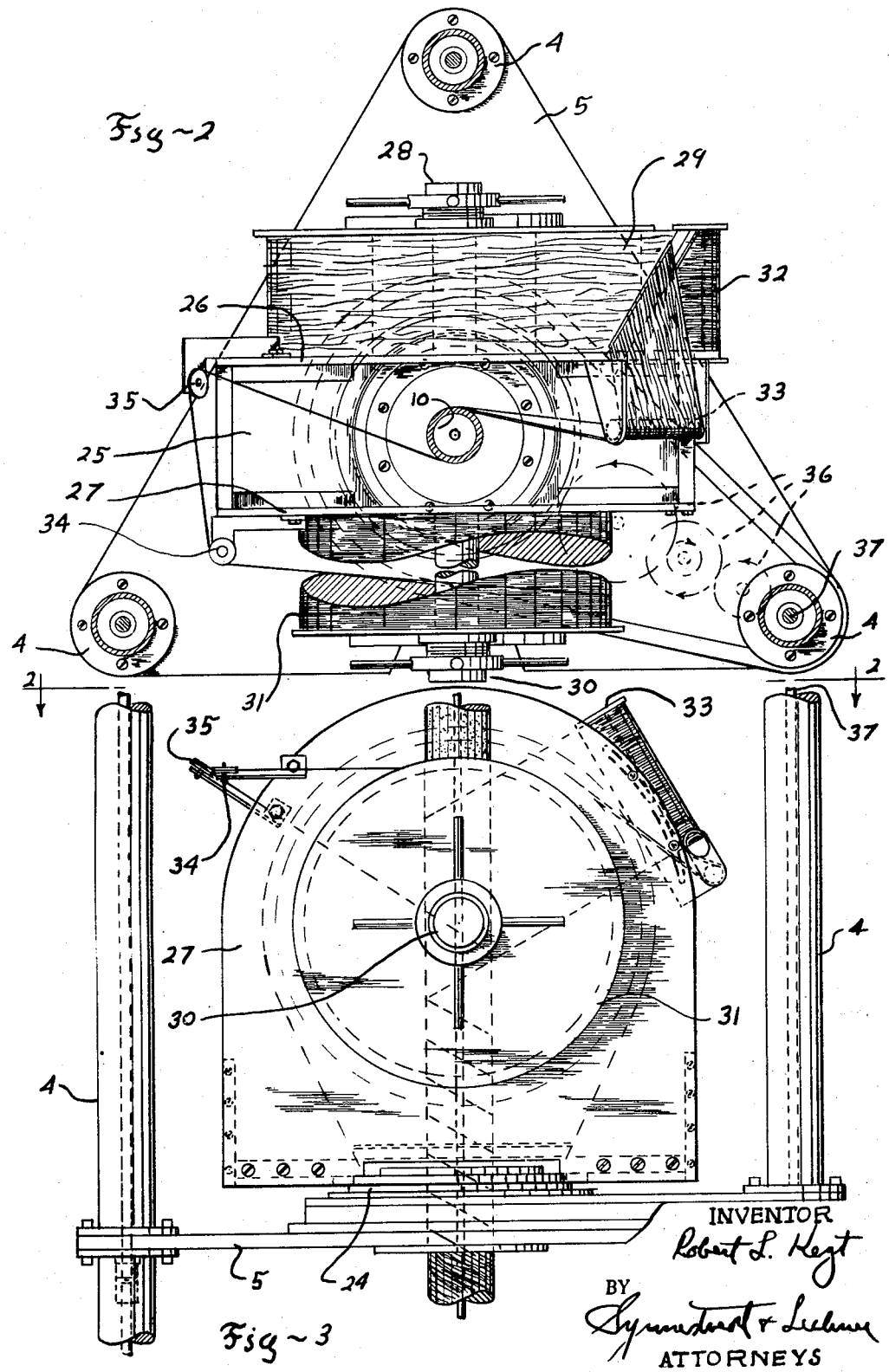

United States Patent Office 3,391,040
Patented July 2, 1968

3,391,040
METHOD AND APPARATUS FOR MAKING FIBER REINFORCED RESIN ARTICLES IN TUBULAR FORM
Robert L. Keyt, Bristol, Va., assignor, by mesne assignments, to Koppers Company, Inc., Pittsburgh, Pa., a corporation of Delaware
Filed May 7, 1964, Ser. No. 365,676
4 Claims. (Cl. 156—171)

ABSTRACT OF THE DISCLOSURE

In the method for making filament reinforced resin tubular articles using a forming device having a heated portion to solidify the resin of the article, strip reinforcing material is helically wound around a core, and simultaneously filament roving material is helically wound over the strip material by means of a turntable rotating about the core on which are mounted sources of supply of both strip and roving reinforcements. The strip and roving reinforcements are directed along substantially parallel paths onto the core on which heat hardenable resin is deposited.

---

This invention relates to the production of fiber reinforced resin articles and is particularly concerned with the production of such articles in tubular form in which one or more strips of random fiber mat reinforcements are incorporated in the article.

The use of such random fiber mat reinforcements, especially glass fiber mats, is desirable in the production of various fiber reinforced articles, such as tubes or pipes for several reasons including the fact that the random fiber mat is of lower cost than certain other forms of glass fiber reinforcements, for instance strips formed of woven fabrics. In addition the random fiber type of mat is highly effective as a reinforcement because of the fact that the fibers extend at random and thus in all directions in the plane of the mat. Such mat reinforcement still further provides effective distribution of the fibers of the reinforcement substantially uniformly throughout the layer or the ply in which the mat is disposed.

Although such mat reinforcements have various advantages as above mentioned, they are also subject to certain difficulties especially as a matter of processing or handling in the operation of producing the fiber reinforced resin articles. These difficulties revolve chiefly around the fact that the mat is of relatively low strength, especially when wetted with liquid resin materials, particularly those commonly employed for impregnating the reinforcements in preparation for making the reinforced articles therefrom.

The principal object of the invention is the provision of a method and equipment adapted to facilitate or make possible the use of mat type of reinforcements in certain types of article forming operations by feeding or winding with the mat a roving of relatively high strength, whereby the roving itself contributes processing strength to the mat and avoids breakage thereof.

In a typical operation according to the invention, a forming device is employed having an opening therethrough preferably extended generally vertically, and a mandrel or core member is suspended from a point above the forming device to extend down into the opening therein, the forming device and core cooperating to provide an annular forming passage for the tubular article to be made. A stream of liquid resin material, for instance the well-known type of heat hardenable polyester laminating resin material, is fed to and caused to flow downwardly on the outside surface of the core member in an upper region thereof, the flow being continued downwardly to the annular forming passage. A random fiber mat reinforcement strip is helically wound upon the core in a region carrying liquid resin material, and this reinforcement, together with any others which are employed are drawn downwardly on the surface of the core into and through the annular forming passage in which the resin material is solidified, the solidified tubular article emerging from the lower end of the forming passage, and all of the materials being drawn through the system by means of puller mechanism located below the forming passage and adapted to grip and pull upon the emerging solidified article. In the absence of provision to the contrary, certain types of random fiber reinforcement strips which would otherwise be useful in a system of the kind just described would tend to weaken and break when the strip became thoroughly wetted with the liquid resin material on the core, as the strip is wound thereon. In order to overcome this difficulty, the present invention provides for the helical winding of a roving on top of the strip to thereby contribute processing strength thereto at the very point at which the strip is being impregnated and thus weakened as a result of being wetted with the liquid resin.

How the foregoing objects and advantages are attained will appear more fully from the following description referring to the accompanying drawings in which:

FIGURE 2 is an enlarged horizontal sectional view taken as indicated by the line 2—2 on FIGURES 1 and 3; and FIGURE 3 is an elevational view of parts of the apparatus shown in FIGURE 2.

Figure 1:
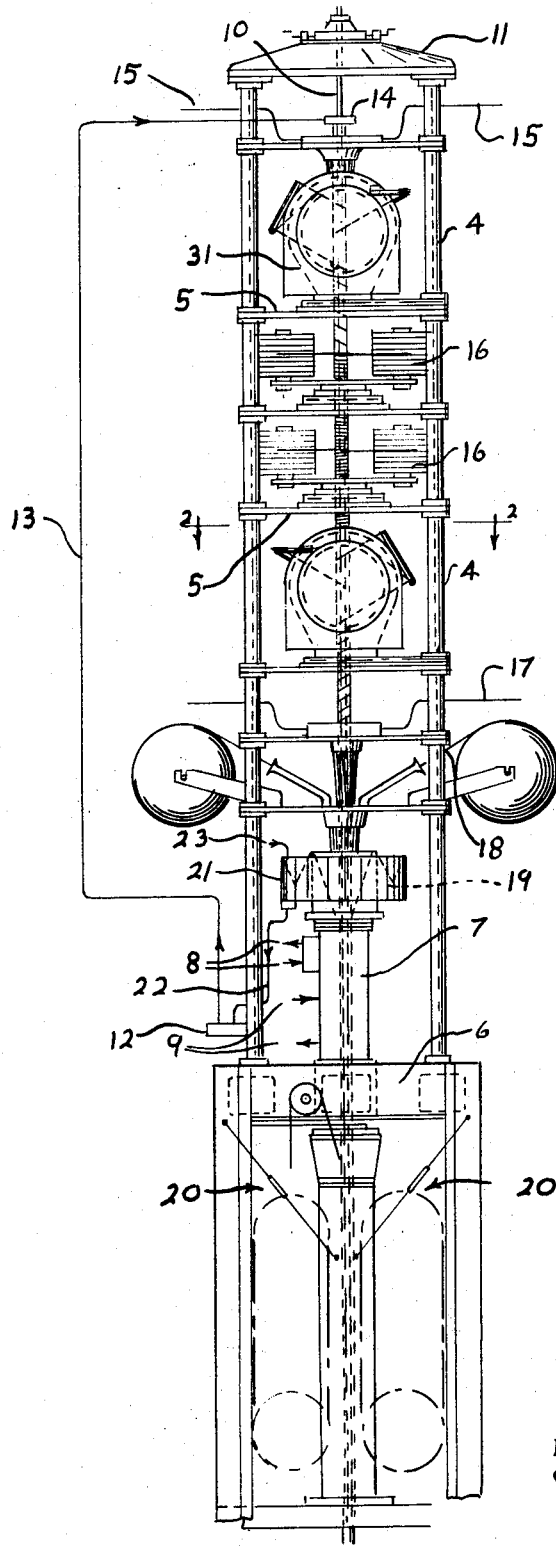
FIGURE 1 is an overall elevational view of a machine adapted to produce continuous lengths of tubular objects by techniques involving the feeding and winding of reinforcement elements on a mandrel on which the reinforcement elements are impregnated with a liquid resin, as above described.

FIGURE 1 corresponds to FIGURE 1 of copending application of Le Roy R. Boggs, Ser. No. 299,636, filed Aug. 2, 1963, now Patent No. 3,306,797, assigned to the assignee of the present application, and because only certain parts of the equipment are involved herein, many parts of the machine as illustrated in FIGURE 1 are not described herein, although reference may be had to said patent for further details if desired. FIGURE 1 as illustrated herein also incorporates certain changes embodying the improvements of the present invention. Similarly FIGURES 2 and 3 correspond to FIGURES 4 and 5 of the patent referred to, although the structure is modified to incorporate the improvements of the present invention.

The general arrangement and overall operation of a machine of the kind illustrated in FIGURE 1 is briefly described here below.

The machine is built up by means of three series of post elements 4 arranged at the corners of triangular plates or decks such as shown at 5, each one of which is adapted to support a portion of the feeding or reinforcement winding equipment used in the machine. At the deck level indicated at 6 a forming device is mounted, comprising an external member 7 having an opening therethrough extended generally vertically and also having a jacket with chambers formed therein so that a cooling liquid may be circulated in an upper portion of the jacket, as by means of connections 8, and so that a heating medium may be circulated through the lower portion of the jacket, as by means of connections indicated at 9.

A mandrel or core member 10 is slung from a cap 11 at the top of the machine and extends all the way down into and through the opening in the external member 7 of the forming device, the core and the member 7 cooperating to provide an annular passage or confining channel in which the article is formed and solidified.

A resin pump 12 delivers resin through the line 13 to an annular discharge device 14 surrounding the core near the upper end thereof and providing for discharge of a stream of liquid resin material on the outer surface of the core to flow downwardly thereon and serve as the source of supply of resin for impregnation of the fibrous reinforcements employed.

At a point just below the resin feed device 14 an annular series of rovings two of which are indicated at 15 are fed to the core and laid longitudinally on the outer surface of the core in a layer or ply comprising the innermost ply of the reinforcements used in the particular embodiment illustrated. At the next station just below the feed of the longitudinal rovings 15, provision is made for the concurrent feed of a random fiber mat reinforcement strip and of a roving wound on the strip. The details of a feed station of this type will be considered more fully here below with particular reference to FIGURES 2 and 3. Before considering those figures, however, brief reference is made to other principal elements of the machine shown in FIGURE 1. Below the mat feeding station just mentioned there are two sequentially arranged roving feeding stations wherein rovings are fed from spools 16, these spools being mounted on turntables so that the rovings fed therefrom are wound helically upon the mandrel. Below the stations for feeding rovings 16, there is another station similar to that referred to above for feeding a mat strip and a superimposed roving in accordance with the technique of the present invention, this station being illustrated in detail in FIGURES 2 and 3.

There next follows an additional ply of longitudinal rovings as indicated at 17, which is followed by mat or other strip reinforcements 18 which are fed longitudinally and comprise the outermost ply of the reinforcements employed in this particular embodiment.

The various reinforcements are impregnated with the liquid resin material flowing down the core as the reinforcements are laid upon or wound upon the core, and all of the reinforcements as a mass or body are drawn downwardly through the conical resin receptacle 19 and thence into and through the annular passage above referred to, which is formed between the core 10 and the external part 7 of the forming device. In the forming device the resin is solidified and the solidified article emerges from the lower end into the puller mechanism which comprises a pair of cooperating crawler tread devices indicated at 20, these devices gripping and pulling on the solidified article and thereby advancing the resin and reinforcements downwardly through the system around the core 10.

It is contemplated that an excess of resin be fed to the core, i.e., an amount in excess of that required (together with the reinforcements) to fill the annular passage in the forming device. This excess of resin is accumulated in the resin receptacle 19 and overflows therefrom into the surrounding resin pan 21 from which the connection 22 is extended to the inlet side of the circulating pump 12. Make-up resin may be introduced into the system at the point indicated at 23.

With the foregoing general arrangement and operation in mind, more specific attention is now directed to the two stations in FIGURE 1 in which random fiber mat strips and rovings are concurrently fed and wound on the mandrel, the upper one of these stations being shown in greater detail in FIGURES 2 and 3.

In considering FIGURES 2 and 3 it is first noted that in the preferred embodiment it is contemplated that the reinforcement elements employed shall be glass fiber reinforcements. As seen in FIGURES 2 and 3, a turntable 24 serves to mount a base plate 25 and two upright plates 26 and 27, one of which carries a spindle 28 serving to mount a spool of random fiber mat reinforcement strip 29 and the other of which carries a spindle 30 serving to mount a spool of glass fiber roving 31. As in the patent above referred to, the mat 29 is fed over guide elements such as those indicated at 32 and 33 and thence to the core 10, being laid on the core helically as the entire mass of the materials is being drawn downwardly on the surface of the core through the forming device by the puller mechanism.

The roving 31 is fed from its spool over guides such as the pulleys 34 and 35 and thence to the core 10 in a position on top of the strip of mat material applied at this station. Preferably the roving 31 is fed in the mid-region of the mat and since the roving spool and the mat spool are both carried by the same turntable, they are wound at the same helix angle and are thereby fed in parallel feed paths.

The turntable 24 is adapted to be rotated by means of gearing indicated in outline at 36 in FIGURE 2, this gearing being extended for interconnection of the turntable with the upright drive shaft 37 which extends vertically through one of the series of hollow post members 4. The lower end of the drive shaft 37 is preferably driven in synchronism with the puller mechanism by means of drive arrangements such as those illustrated in the patent above referred to, but the details of such drive mechanism need not be considered herein.

In accordance with the foregoing, as the strip 29 is helically wound or laid upon the core member 10 the roving 31 is almost immediately laid on top of the strip, so that the strip is reinforced, so to speak, as it is "soaking up" and thus becoming wetted with the liquid impregnating resin flowing down the core surface. In this way random fiber mat reinforcement elements even of very low strength may readily be employed in the system, adequate processing strength being provided by the roving wound therewith.

I claim:

1. In the method of making fiber reinforced resin tubular articles using a device to form said article and to heat and solidify said resin as the article advances through a forming passage in said device, the improvement which comprises the steps:
    (a) feeding heat hardenable liquid resin onto the surface of a core extending into said forming passage; and
    (b) helically winding a continuous length of strip of reinforcement including random felted glass fibers along a first feed path onto said core whereby said strip becomes resin impregnated and simultaneously
    (c) helically winding at least one continuous length of fiber reinforcement including glass roving onto said wound strip along a second feed path, said continuous length of roving being positioned intermediate the edges of said continuous length of wound strip and with the first and second feed paths of said strip and said roving being substantially parallel.

2. In apparatus for making fiber reinforced resin tubular articles including a device for forming said article and for heating and solidifying said resin as said article advances through a forming passage in said device, the improvement comprising:
    (a) a core positioned in said forming passage and extending upstream thereof, said core and said passage defining an annular passage through which said fiber reinforced resin moves;
    (b) means for feeding heat hardenable liquid resin onto the surface of said core in a zone outside of said passage;
    (c) means for helically winding a continuous length of reinforcement including random felted glass fibers along a first feed path onto said core whereby said reinforcement becomes resin impregnated; and
    (d) means for simultaneously helically winding at least one fiber reinforcement including a glass roving along a second feed path onto said wound glass fiber reinforcement with said roving being positioned intermediate the edges of said glass fiber reinforcement and with the feed paths of said roving and said fiber reinforcement being substantially parallel.

3. Apparatus for making fiber reinforced resin tubular articles comprising:
   (a) a forming device having a passage therethrough and in which is positioned a stationary core to form annular passageway in said forming device, said core extending upstream of the feed of fiber reinforcements into and through said annular passageway;
   (b) means for helically winding a continuous length of random fiber mat reinforcing in the form of a strip onto said core in a region thereof carrying heat hardenable liquid resin to effect resin impregnation of said mat and
   (c) means for simultaneously helically winding a fiber roving reinforcement on top of said strip whereby said roving is resin impregnated and extends generally parallel to the longitudinal axis of said fiber mat strip;
   (d) means for advancing the strip and roving structure through said annular passageway; and
   (e) means for heating and solidifying said resin to form said tubular article.

4. The apparatus of claim 3 including:
   (a) a turntable surrounding said core upstream of said forming passage that supports sources of supply of both the strip and the roving material; and
   (b) means for rotating said turntable.

References Cited
UNITED STATES PATENTS

| | | | |
|---|---|---|---|
| 2,696,244 | 12/1954 | Jackson | 156—171 |
| 3,249,481 | 5/1966 | Boggs | 156—441 X |
| 3,306,797 | 2/1967 | Boggs | 156—171 |
| 2,871,911 | 2/1959 | Goldsworthy et al. | 156—441 X |

EARL M. BERGERT, *Primary Examiner.*

PHILIP DIER, *Examiner.*